United States Patent
Bernier et al.

(10) Patent No.: US 6,754,171 B1
(45) Date of Patent: Jun. 22, 2004

(54) METHOD AND SYSTEM FOR DISTRIBUTED CLOCK FAILURE PROTECTION IN A PACKET SWITCHED NETWORK

(75) Inventors: Daniel J. Bernier, Barrington, NH (US); Deborah E. Edin, Stratham, NH (US); Stewart G. Kenly, Stratham, NH (US)

(73) Assignee: Enterasys Networks, Inc., Andover, MA (US)

( * ) Notice: Subject to any disclaimer, the term of this patent is extended or adjusted under 35 U.S.C. 154(b) by 0 days.

(21) Appl. No.: 09/573,327

(22) Filed: May 18, 2000

(51) Int. Cl.[7] .................................................. H04L 7/00
(52) U.S. Cl. .................. 370/216; 370/360; 714/12; 714/731
(58) Field of Search ................................. 370/216, 351, 370/357, 359, 360; 375/354, 355; 714/100, 12, 47, 55, 731, 744

(56) References Cited

U.S. PATENT DOCUMENTS

| | | | | |
|---|---|---|---|---|
| 4,736,393 A | * | 4/1988 | Grimes et al. ............... | 375/356 |
| 4,916,690 A | * | 4/1990 | Barri ........................... | 370/422 |
| 4,972,442 A | * | 11/1990 | Steierman .................... | 375/357 |
| 5,136,617 A | * | 8/1992 | Stenard ........................ | 375/357 |
| 5,577,075 A | * | 11/1996 | Cotton et al. ................ | 375/356 |
| 5,796,795 A | | 8/1998 | Mussman et al. ........... | 375/372 |
| 5,859,846 A | * | 1/1999 | Kim et al. ............. | 370/395.62 |
| 5,870,441 A | | 2/1999 | Cotton et al. ................ | 375/354 |
| 6,061,802 A | * | 5/2000 | Gulick ......................... | 713/400 |
| 6,121,816 A | | 9/2000 | Tonks et al. | |
| 6,343,334 B1 | * | 1/2002 | Uemura et al. ................ | 710/8 |

FOREIGN PATENT DOCUMENTS

| | | |
|---|---|---|
| EP | 0722233 A2 | 7/1996 |
| WO | WO-98-25436 | 6/1998 |
| WO | WO-00-22763 | 4/2000 |

OTHER PUBLICATIONS

John E. Abate; AT&T's New Approach to the Synchronization of Telecommunication Networks; I.E.E.E. Communications Magazine; Apr. 27, 1989; 11 pgs.; No. 4; New York, NY, US.

Ninko B. Radivojevic/Predrag Z. Micovic; Design and Testing of SDH Equipment Clock (SEC) in SDH 155Mbit/s System; Oct. 13–15, 1999; 4 pgs.; Nis, Yugoslavia.

* cited by examiner

*Primary Examiner*—Hassan Kizou
*Assistant Examiner*—D Levitan
(74) *Attorney, Agent, or Firm*—Mark A. Wilson

(57) ABSTRACT

Protection from a distributed clock failure in a packet switched network device involves monitoring primary clocking information that is received from an input port of the network device, distributing the clocking information to an output port for use in synchronous transmissions, and supplying backup clocking information from within the packet switched network device to the output port if the primary clocking information fails. In an embodiment, the integrity of the primary clocking information is directly monitored in hardware and the backup clocking information is provided by a local clock source that is located within the network device. If a failure in the primary clocking information is detected, the backup clocking information is supplied to the output port from the local clock source. Because the integrity of the primary clocking information is monitored in hardware and because the clock switching is hardware triggered, a clock failure can be identified and corrected in a relatively short period of time, thereby minimizing packet loss during clock failures. In an embodiment, the hardware based failure protection mechanism provides failure protection on a single switch module. In an embodiment, the hardware based failure protection mechanism provides failure protection to a network device that includes multiple switch modules. In an embodiment, a firmware based failure protection mechanism can be programmed to provide a secondary clock from sources other than a local clock source.

19 Claims, 13 Drawing Sheets

METHOD AND SYSTEM FOR DISTRIBUTED CLOCK FAILURE PROTECTION IN A PACKET SWITCHED NETWORK

FIELD OF THE INVENTION

The invention relates to packet switched communications networks and more particularly to the distribution of a clock within a packet switched network device.

BACKGROUND OF THE INVENTION

Circuit switched digital telecommunications networks are end-to-end synchronized communications system that are ideal for carrying voice conversations. Clocking signals utilized to synchronize circuit switched networks are typically generated in a central location and are then distributed to various switching hardware throughout the network.

Because the integrity of the network depends on synchronized clocking, it is important that the clock distribution mechanism can recover from a failure in the master clock distribution system. Specifically, in order to prevent degradation of voice conversations, a failed clock signal should be recovered in less than 50 microseconds. One technique for recovering from a failed clock in a circuit switched telecommunications network is disclosed in U.S. Pat. No. 5,870,441 issued to Cotton et al.

In contrast to circuit switched digital telecommunications networks, packet switched networks do not provide end-to-end synchronized connections between users and are therefore not as adapt at carrying voice conversations. In an effort to emulate the voice carrying capability of circuit switched networks and to maximize the bandwidth of packet switched networks, it is desirable to provide synchronized connections between network nodes in a packet switched network. For example, in an optical network utilizing asynchronous transfer mode (ATM) over synchronous optical network (SONET)/synchronous digital hierarchy (SDH) it is desirable to be able to receive a signal on an input port of a network switch and to transmit a synchronized version of the signal from an output port of the same switch.

Providing synchronized transmissions in packet switched networks typically involves recovering the clock from a selected incoming signal and distributing the recovered clock to target ports of a network switch. The recovered clock is then utilized by output ports on the switch to transmit synchronized signals to other network switches. While the distribution of a synchronized clock throughout a packet switched network works well to emulate a circuit switched network, the clock timing of the packet switched network is subject to a single point of failure. That is, if the transmission link carrying the source clock fails then the ports in the network that are relying on the source clock will not have a clock to transmit signals.

As with circuit switched networks, it is important that packet switched networks can quickly recover from a failure of a distributed source clock. Although a circuit switched network carrying primarily voice conversations can withstand up to 50 microseconds of interruption due to a clock failure, a high bandwidth packet switched network will suffer a large volume of dropped packets during a clock failure that lasts up to 50 microseconds. In order to minimize the volume of packets that are dropped as a result of a distributed clock failure, it is desirable to overcome clock failures in as short of time as possible.

In view of the push towards making high bandwidth packet switched networks emulate circuit switched networks and in view of the large volume of packets that are lost when a distributed clock in a packet switched network fails, what is needed is a technique for providing protection from a distributed clock failure in a packet switched network.

SUMMARY OF THE INVENTION

A system and method for providing protection from a distributed clock failure in a packet switched network device involves monitoring primary clocking information that is received from an input port of the network device, distributing the clocking information to an output port for use in synchronous transmissions, and supplying backup clocking information from within the packet switched network device to the output port if the primary clocking information fails. In an embodiment, the integrity of the primary clocking information is directly monitored in hardware and the backup clocking information is provided by a local clock source that is located within the network device. If a failure in the primary clocking information is detected, the backup clocking information is supplied to the output port from the local clock source. Because the integrity of the primary clocking information is monitored in hardware and because the clock switching is hardware triggered, a clock failure can be identified and corrected in a relatively short period of time, thereby minimizing packet loss during clock failures.

In an embodiment, the hardware based failure protection mechanism provides failure protection on a single switch module. In an embodiment, a switch module includes a first input port for receiving flows of packets and a primary clock, a fault monitoring system within the switch module for detecting a failure of the primary clock, a first output port for transmitting flows of packets, circuitry for distributing the primary clock from the first input port to the first output port, a transmitter that utilizes the primary clock for transmitting packets from the first output port in synchronization with the primary clock, a secondary clock source that provides a secondary clock within the switch module, and circuitry for supplying the secondary clock to the first output port upon detection of a failure of the primary clock by the fault monitoring system. In an embodiment, the secondary clock is a local clock source that resides within the switch module.

In an embodiment, the hardware based failure protection mechanism provides failure protection to a network device that includes multiple switch modules. The network device includes a first switch module located within the network device with the first switch module including a first input port for receiving flows of packets and a primary clock, circuitry for distributing the primary clock from the first input port to other output ports on other switch modules within the network device, and a second switch module located within the network device having a first output port for transmitting packets in synchronization with the primary clock. The hardware based failure protection mechanism also includes circuitry for providing a secondary clock, a link fault monitor for detecting a failure of the primary clock, and circuitry for supplying the secondary clock to the first output port upon detection of a failure of the primary clock. In an embodiment, the secondary clock is a local clock source that resides within the second switch module.

In an embodiment, a firmware based failure protection mechanism involves programming a firmware control unit to provide a specified clock as a secondary clock in case of a failure of the primary clock. In an embodiment, the secondary clock is obtained from a second input port and not from a local clock source. The firmware control unit can be programmed to provide the secondary clock from various sources and therefore provides a more customized and permanent solution to failure protection than the hardware based mechanisms.

In an embodiment, a clock failure protection method includes steps of receiving flows of packets and a primary clock at a first input port of a packet switched network device, monitoring the primary clock, within the packet switched network device, for a clock failure, distributing the primary clock to a first output port of the packet switched network device, transmitting packets from the first output port in synchronization with the primary clock, and supplying the first output port with a local clock source from within the network device for the transmission of packets when the monitoring of the primary clock indicates a clock failure.

In an embodiment of the method, the step of monitoring includes utilizing a field programmable gate array located within the packet switched network device to determine if the primary clock has failed. In an embodiment of the method, the step of supplying the first output port with a local clock source includes switching a multiplexer from receiving the primary clock to receiving the local clock source in response to a failure of the primary clock. In an embodiment of the method, the multiplexer is switched within 30 microseconds of a failure of the primary clock. In an embodiment, the method further includes a step of generating control signals from a firmware control unit in order to supply a secondary clock from a second input port of the packet switched network device to the first output port in place of the local clock source.

BRIEF DISCRIPTION OF THE DRAWINGS

DETAILED DESCRIPTION OF THE INVENTION

Figure 1:
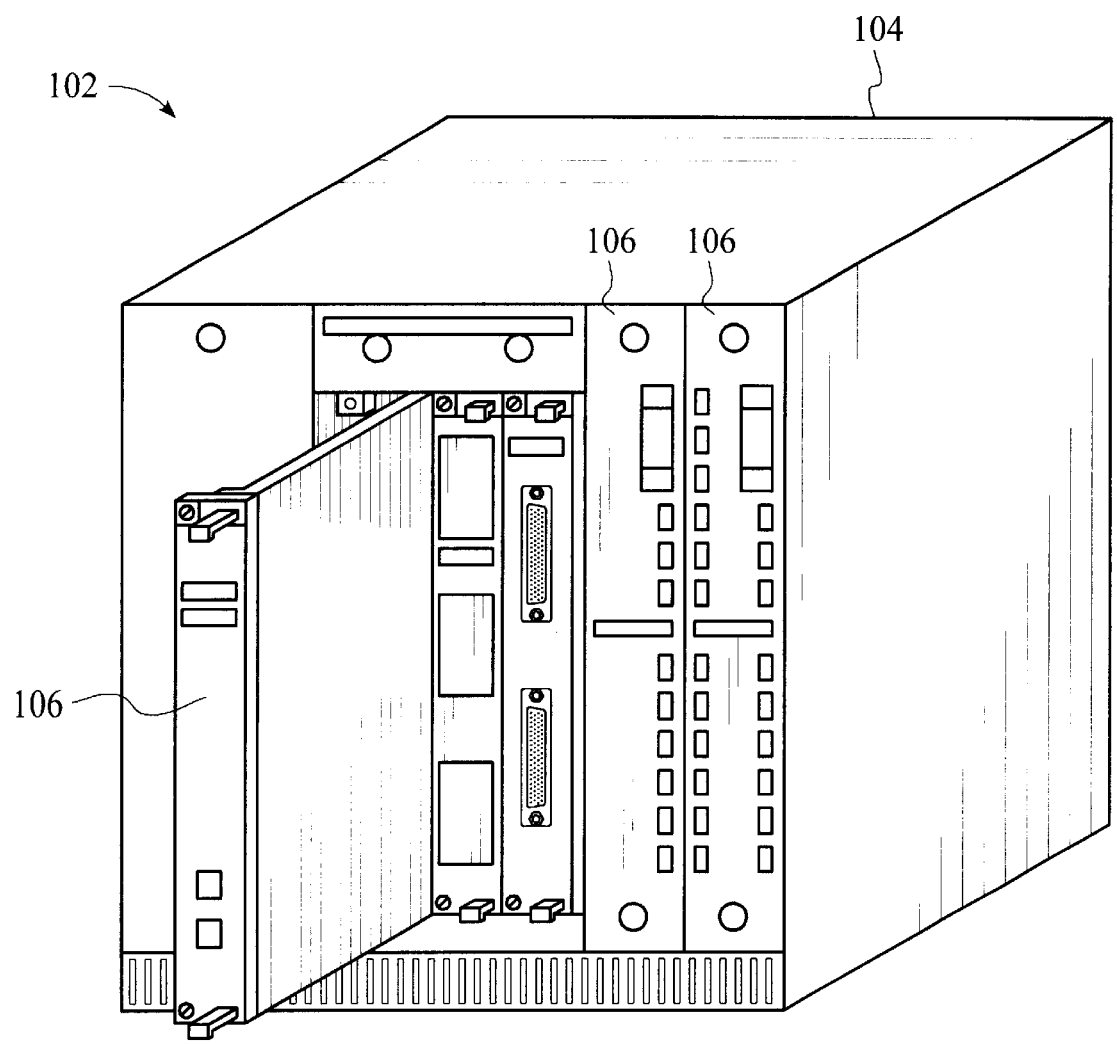
FIG. 1 depicts an embodiment of a chassis-based network device.

An embodiment of the invention involves a chassis-based network switch. The chassis-based network switch includes a chassis, or housing, that accepts various network cards. FIG. 1 depicts an embodiment of a chassis-based network device 102 that is used in computer and computer networking environments. In the embodiment of FIG. 1, the chassis 104 is a mechanical enclosure that includes slots that hold the network cards. The network cards 106, referred to herein as switch modules, can be independently removed from the chassis while the network device is in operation. In an embodiment, one chassis can hold up to fourteen switch modules and each switch module has the ability to function as its own switching device. In an embodiment, each switch module includes its own multifunction processor and its own switch fabric. The switch modules are electronically connected within the chassis by a backplane circuit card (backplane). The backplane enables electronic signals from one switch module to be transferred to any other switch module.

As is described in more detail below, the switch modules include the transmission and receive ports that connect the network device to other network devices via communications links such as optical fiber links and/or copper wire links. The chassis based network device may transfer information in any combination of packets, cells, frames, and/or datagrams utilizing IP compatible protocols such as SONET/SDH and ATM.

Clock Distribution

Figure 2:
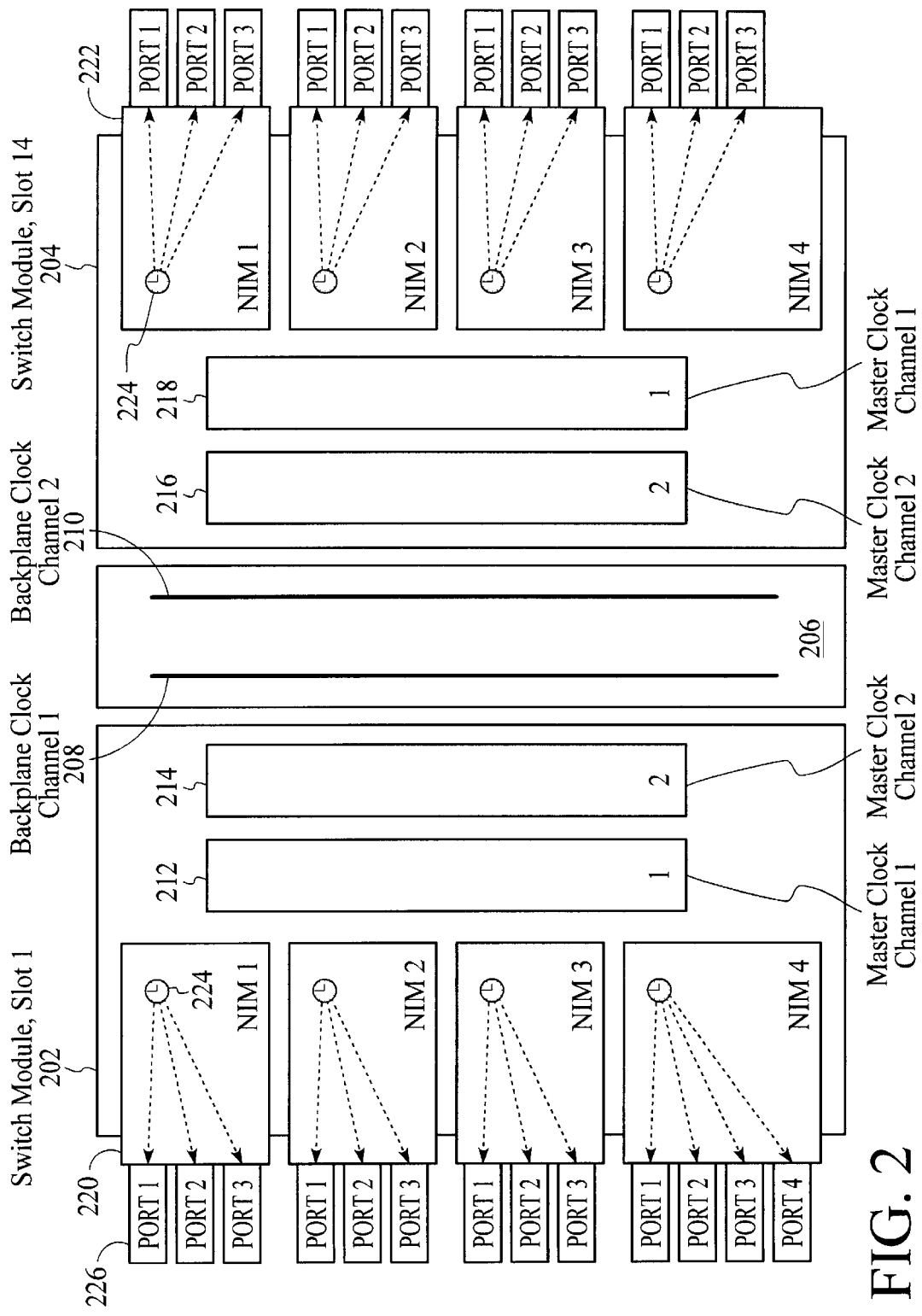
FIG. 2 is a depiction of a default configuration of two switch modules that are connected to the backplane of a fourteen slot chassis.

FIG. 2 is a high level depiction of two switch modules 202 and 204 that are connected to the backplane 206 of a fourteen slot chassis. For discussion purposes, one of the switch modules is installed in slot 1 of the chassis and the other switch module is installed in slot 14. Although a fourteen slot chassis and two switch modules are shown, it should be understood that the number of slots and switch modules is not critical.

In the embodiment of FIG. 2, the backplane 206 includes two backplane clock channels 208 and 210 that enable clock signals to be shared between switch modules. In an embodiment, the backplane clock channels are separate buses that have terminations on either end. As is described in detail below, clock signals that are carried on backplane clock channels 1 and 2 are referred to as backplane clocks 1 and 2 (BPCLK1 and BPCLK2), respectively. The two backplane clock channels allow for the simultaneous distribution of two different clock speeds in the same chassis. For example, backplane clock channel 1 can be used to pass information for SONET clocking (19.44 MHz) between switch modules, while backplane clock channel 2 can be used to pass information for DS-3 clocking (44.76 MHz) between switch modules.

Each one of the two switch modules 202 and 204 includes two master clock channels 212, 214, 216, and 218 and four network interface modules (NIMs) 220 and 222. Referring to the switch module 202 in slot 1, the master clock channels 212 and 214 enable clock signals to be shared between all of the network interface modules 220 on the same switch module. The two master clock channels allow network interface modules that use different clock speeds to pass clocking information to other network interface modules on the same switch module. For example, master clock channel 1, MCLK 1, can be used to pass information for SONET/SDH clocking to other network interface modules on the same switch module, while master clock channel 2, MCLK 2, can be used to pass information for DS-3 clocking to other network interface modules.

The network interface modules 220 and 222 are circuit boards that include the ports on which transmission signals are sent and received in addition to a local clock source 224. In an embodiment, the network interface modules carry ATM over SONET/SDH traffic, although other network protocols may be utilized. On switch module 1, 202, three of the network interface modules have three ports 226 that transmit and receive data in the OC-3 traffic class over multimode fiber optic cable. One of the network interface modules on switch module 1 has four ports that transmit and receive data in the OC-3 traffic class over Category 5 unshielded twisted pair (UTP) cable. On switch module 14, 204, all four of the network interface modules have three ports that transmit and receive data in the OC-3 traffic class over multimode fiber optic cable although it should be understood that the exact number of network interface modules or ports and the traffic class of the information is not critical to the invention. In an embodiment, the local clock sources 224 on the network interface modules include a 20 ppm 19.44 MHz crystal reference oscillator.

FIG. 2 represents a default clocking configuration for the two switch modules 202 and 204. Each port 226 on each network interface module 220 and 222 utilizes the local clock source 224 located on the local network interface module for its transmit clock as indicated by the dashed lines from each local clock source to the respective ports. In the default configuration, incoming clocking information is not utilized for transmission and clocking information is not distributed between ports, network interface modules, or switch modules. The automatic clock failure protection provided in the network device is the focus of the invention and is described in more detail below.

Figure 3:
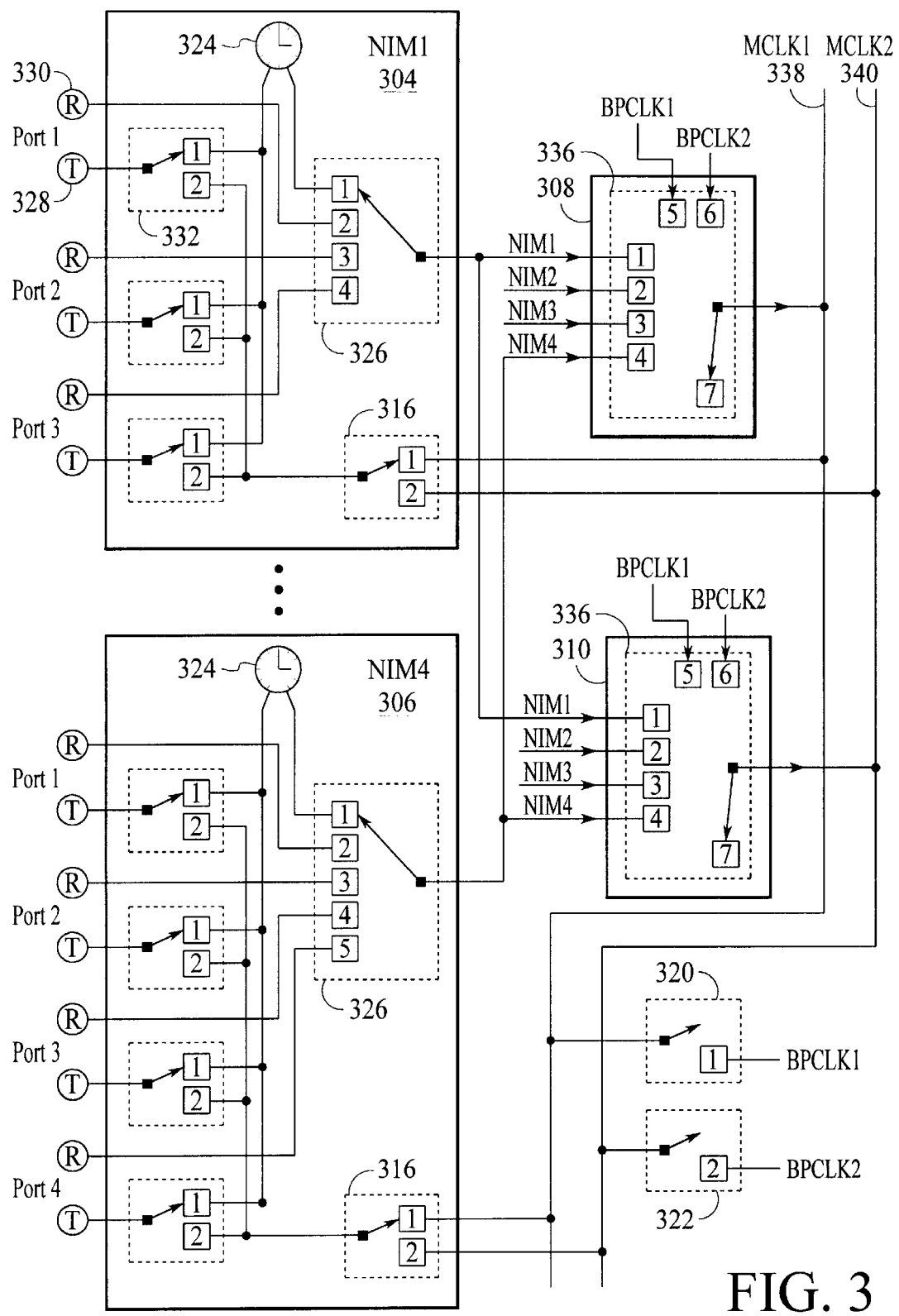
FIG. 3 is a detailed depiction of an embodiment of one switch module from FIG. 2 that is in the default clocking configuration, in accordance with an embodiment of the invention.

FIG. 3 is a detailed depiction of an embodiment of one switch module, for example, switch module 1, 202 from FIG. 2 that is in the default clocking configuration. The detailed depiction of the switch module shows network interface modules 1 and 4, 304 and 306 respectively and includes master clock controllers 308 and 310 and backplane clock switches 320 and 322.

Referring to network interface module 1 304 for description purposes, each network interface module includes a local clock 324, a receive clock multiplexer 326, a master clock selector 316, and at least one port having a transmitter 328, a receiver 330, and a transmission clock multiplexer 332. The transmission clock multiplexers for each port enables the clock source of each transmitter to be switched between the local clock source and a master clock source. The receive clock multiplexer 326 selects between the local clock and clocks that are recovered from the port receivers on the respective network interface module. In an embodiment, the receive clock multiplexer includes circuitry for identifying which port is being utilized as a source clock and for detecting a failure in the source clock. The master clock channel selectors 316 within each network interface module control which master clock channel is distributed within the respective network interface module 304 and 306. In an embodiment, the master clock channel selectors 316 include a master clock multiplexer that switches between master clock channels. For example, if one of the master clock channel selectors is set to 1, then MCLK 1, 338 is active on the respective network interface module, and likewise if the master clock channel selector is set to 2, then MCLK 2, 340 is active on the network interface module. In a preferred embodiment, the multiplexers are controlled by registers that are instantiated in programmable logic, such as field programmable gate arrays. Firmware management information blocks can be utilized to insert values into the registers in order to control the multiplexers.

The two master clock controllers 308 and 310 determine which clock signals are carried on the two master clock channels, MCLK 1, 338 and MCLK 2, 340, respectively. That is, master clock controller 308 controls the clock signal that is fed to master clock channel 1, MCLK 1, and master clock controller 310 controls the clock signal that is fed to master clock channel 2, MCLK 2. Each of the master clock controllers includes a master clock multiplexer 336 that selects the clock signal that is supplied to the respective master clock channel. In the embodiment of FIG. 3, each of the master clock multiplexers can select between seven clock signal choices, including one clock from each of the four network interface modules (settings 1–4), one clock from one of the two backplane clock channels (settings 5 and 6), or no clock (setting 7). As shown in FIG. 3, when the no clock setting is selected, no clocking information is supplied to the respective master clock channel.

The backplane clock switches 320 and 322 allow a master clock signal generated from a switch module to be fed to a respective backplane clock channel. Clock signals carried on the backplane clock channels can be distributed to other switch modules that are connected into the same chassis. In an embodiment, the switch module that is driving a backplane clock generates a pulse approximately twelve nanoseconds wide for every rising edge of the active clock. The pulses are generated in order to reduce signal integrity related glitches that can produce bit errors. Switch modules that receive a backplane clock also generate pulses that are triggered from the backplane clock. Switch modules that are receiving the backplane clock produce a wider pulse to prevent re-triggering between driving pulse periods.

As stated above, the switch module shown in FIG. 3 is in the default configuration. In the default configuration, all of the transmission clock multiplexers 332 are set to receive clocking signals from the local clock 324 (setting 1) and all of the master clock controllers 308 are set to provide no clocking signals to the master clock channels (setting 7). Also in the default configuration, the receive clock multiplexers 326 are set to the local clocks (setting 1) and the backplane clock switches 320 and 322 are open although this is not critical.

Figure 4:
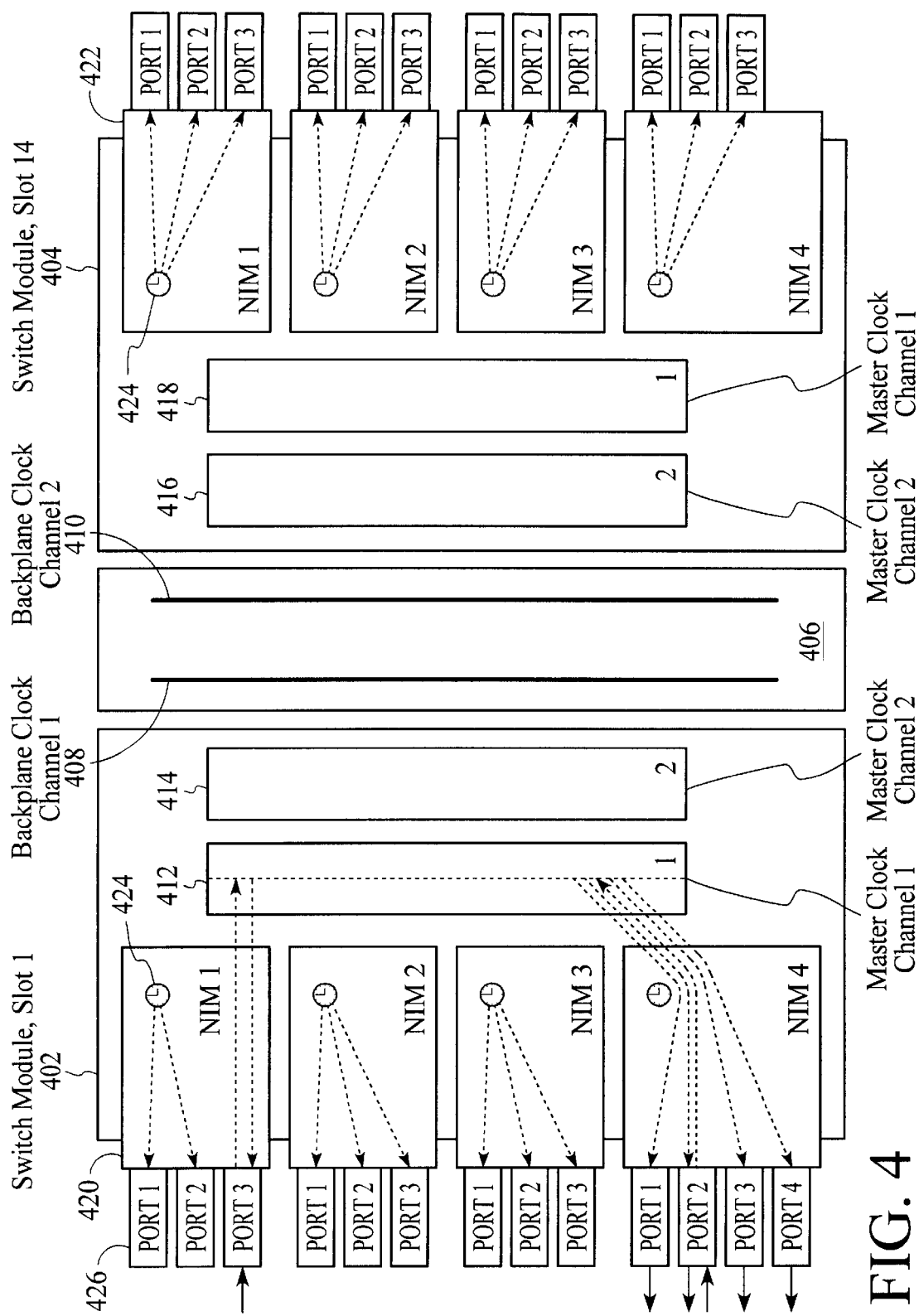
FIG. 4 is an example of a clock signal that is distributed over a master clock channel to a different network interface module on the same switch module.

FIG. 4 is an example of a switch module that is configured to distribute a clock signal to different network interface modules 420 on the same switch module 402. In the example shown in FIG. 4, a source clock is recovered from port 3 of network interface module 1 on switch module 402 in slot 1 and 30 distributed on master clock channel 1, 412. The recovered clock that is carried on master clock channel 1 is utilized by ports 1, 2, 3, and 4 of network interface module 4 on switch module 402 in slot 1 for the transmission clock. The recovered clock is also utilized by port three of network interface module 1 for the transmission clock. Because port three of network interface module 1 and ports 1, 2, 3, and 4 of network interface module 4 are configured to utilize the same clock, a synchronous connection exists between port 3 of network interface module 1 and ports 1, 2, 3, and 4 of network interface module 4. Ports 1 and 2 of network interface module 1 and all of the ports on network interface modules 2 and 3 and on the slot 14 switch module 404 are configured to utilize their local clock 424 for the transmission clock as indicated by the dashed lines from the local clocks to the ports. As is explained in more detail below, in the embodiment of FIG. 4, port 2 of network interface module 4 on switch module 402 in slot 1 is established as a firmware controlled standby clock in case the clock signal recovered at port 3 of network interface module 1 fails. It should be noted that in some instances, similar numbers are used to identify similar elements in related figures.

Figure 5:
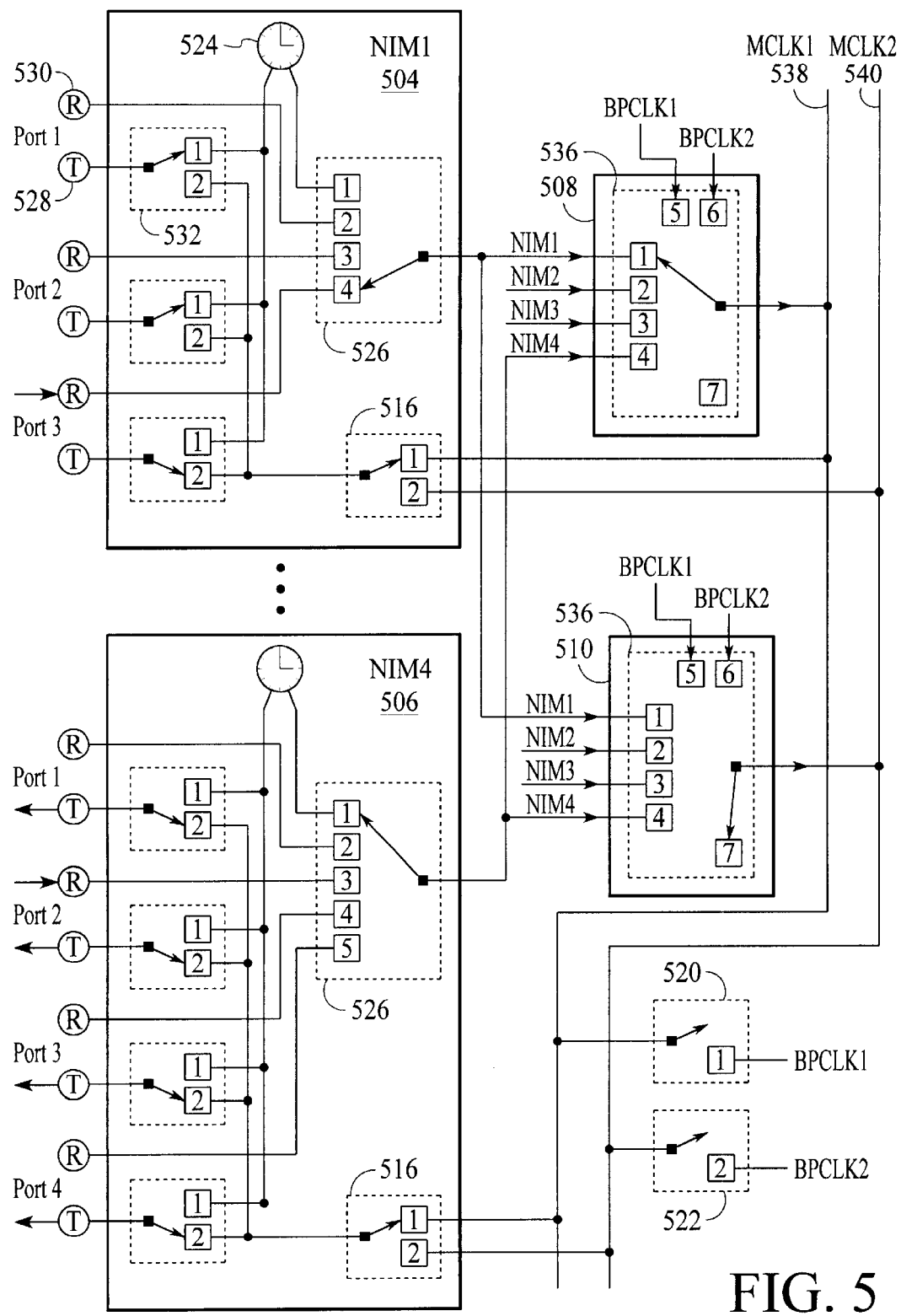
FIG. 5 is a detailed depiction of a switch module from FIG. 4 that is configured to distribute clock signals to different network interface modules, in accordance with an embodiment of the invention.

FIG. 5 is a detailed depiction of network interface modules 1 and 4, 504 and 506 configured to accomplish the clock distribution as shown in FIG. 4. Referring to network interface module 1, the receive clock multiplexer 526 is set to receive a recovered clock signal from port 3 (setting 4) as indicated by the arrow. The master clock controller 508 for master clock channel 1 is set to receive a clock signal from network interface module 1 (setting 1) as indicated by the arrow. Because of the settings of the receive clock multiplexer 526 and the master clock controller 508, master clock channel 1, 538 receives the recovered clock from port 3 of network interface module 1. The master clock selectors 516 of network interface modules 1 and 4 are set to receive the clock signal, MCLK 1, from master clock channel 1 (setting 1) as indicated by the arrows. The transmission clock multiplexer 532 for port 3 of network interface module 1 and the transmission clock multiplexers 532 for ports 1, 2, 3, and 4 of network interface module 4 are set to utilize the master clock (setting 2) instead of the local clock (setting 1) to transmit signals. The transmission clock multiplexers for ports 1 and 2 of network interface module 1 are set to utilize the local clock (setting 1) to transmit signals. Because port 3 of network interface module 1 and ports 1, 2, 3, and 4 of network interface module 4 are utilizing the same clock, a synchronous connection exists between port 3 of network interface module 1 and ports 1, 2, 3, and 4 of network interface module 4.

Figure 6:
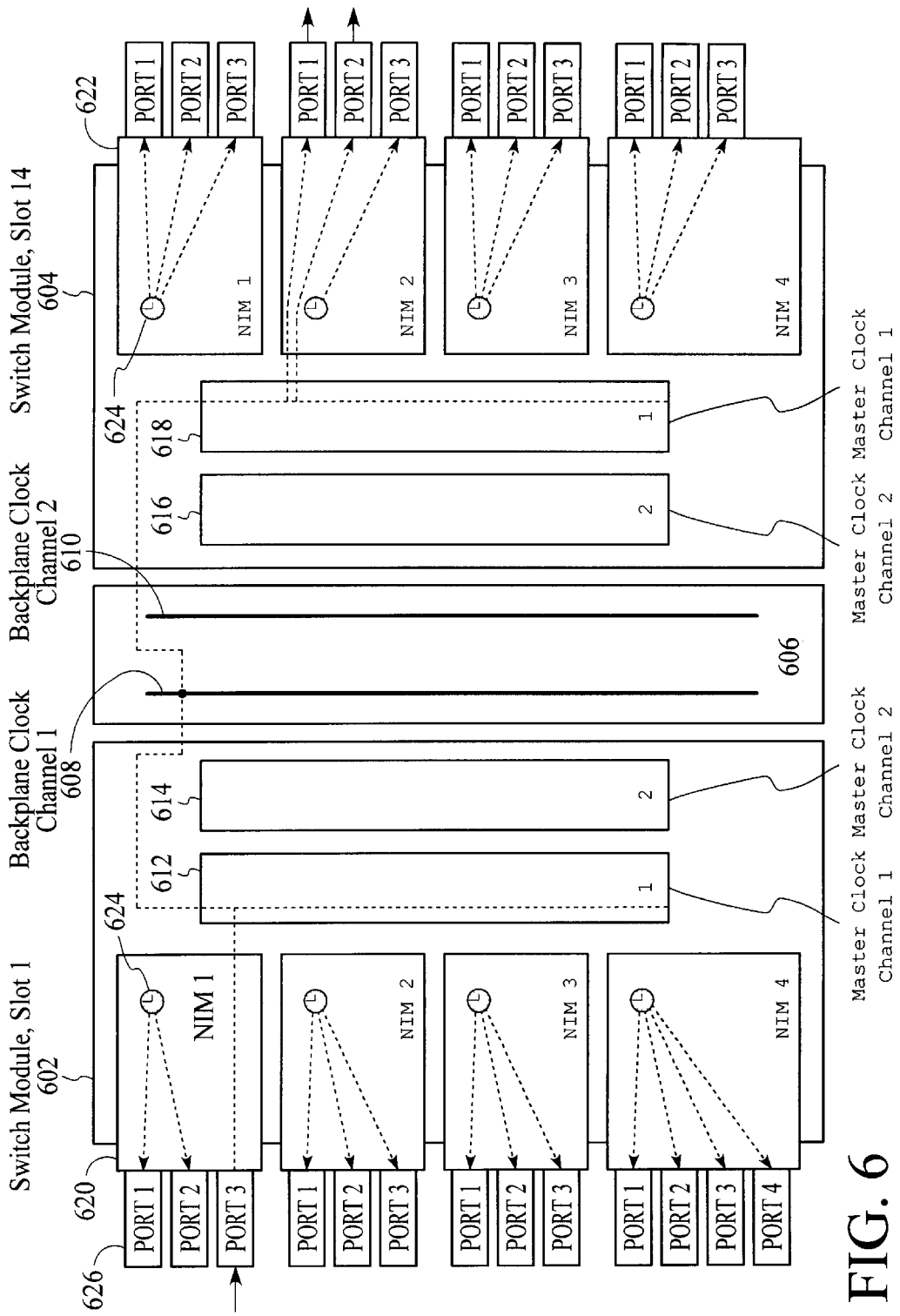
FIG. 6 is an example of a clock signal that is distributed over a backplane clock channel to ports on a different switch module.

FIG. 6 is an example of a clock signal that is distributed across the backplane 606 of the chassis to a different switch module or modules. In the example shown in FIG. 6 a source clock is recovered from port 3 of network interface module 1 on switch module 602 in slot 1 and utilized as a transmission clock by ports 1 and 2 of network interface module 2 on switch module 604 in slot 14. In order to distribute the recovered clock as shown in FIG. 6, the recovered clock is first transmitted to master clock channel 1, 612 on switch module 602. From master clock channel 1 on switch module 602, the recovered clock is transmitted to backplane clock channel 1, 608 on the backplane and then to master clock channel 1, 618 on switch module 604. From master clock channel 1 on switch module 604, the recovered clock is distributed to the transmitters of ports 1 and 2 on network interface module 2, thereby creating a synchronous connection between port 3 of network interface module 2 on switch module 602 and ports 1 and 2 of network interface module 2 on switch module 604. The dashed lines in FIG. 6 depict the path of the recovered clock from the receiving port on switch module 602 to the transmitting ports on switch module 604.

Figure 7A:
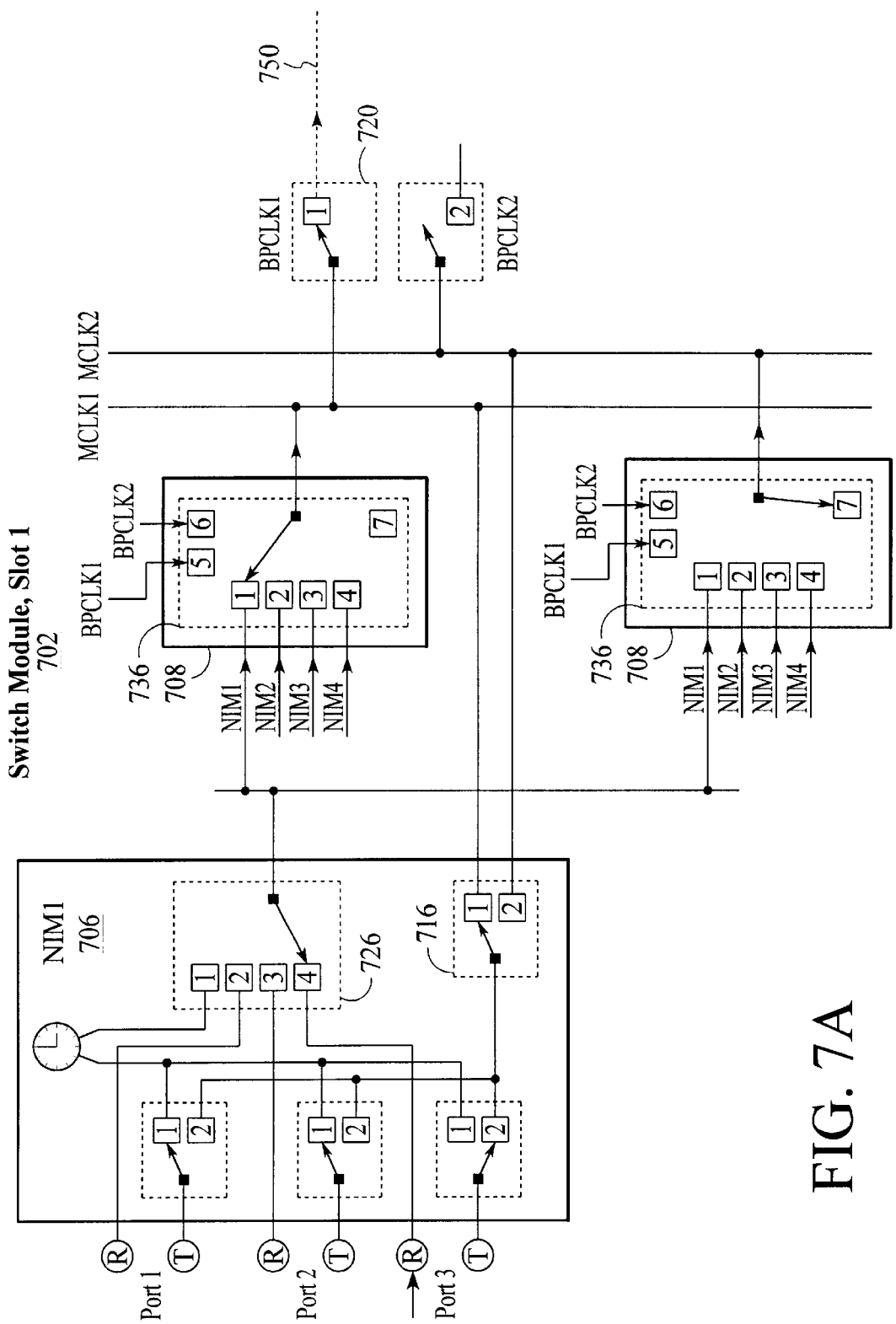
FIGS. 7A and 7B are a detailed depiction of two switch modules from FIG. 6 that are configured to distribute clock signals over the backplane clock channel to ports on a different switch module, in accordance with an embodiment of the invention.
Figure 7B:
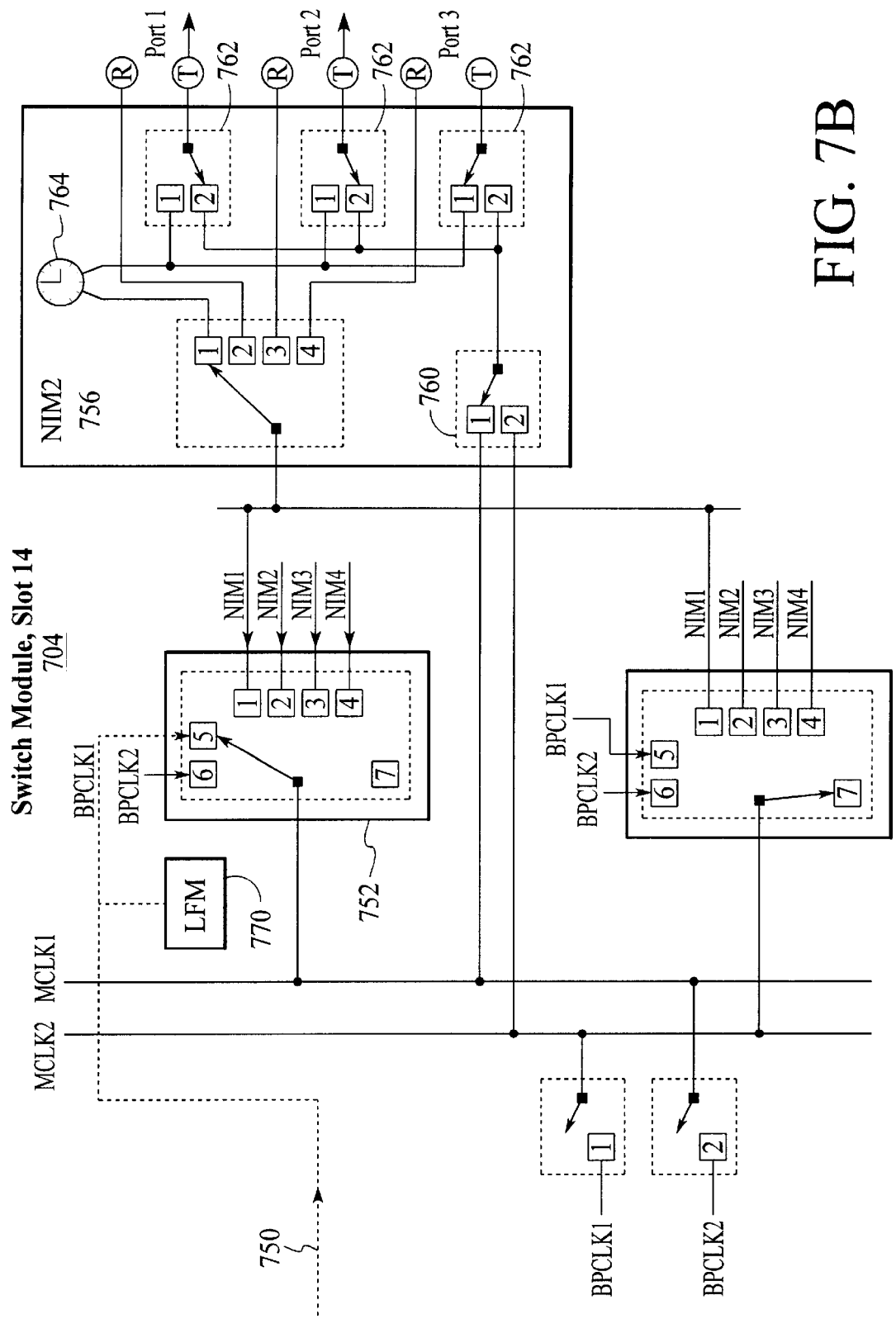

FIGS. 7A and 7B are a detailed depiction of a circuit configuration that accomplishes the clock distribution shown in FIG. 6. The detailed depiction includes selected portions of the slot 1 switch module 702 and the slot 14 switch module 704. Referring to network interface module 1, 706 on the slot 1 switch module 702, the channel select multiplexer 726 is set to receive a recovered clock from port 3 (setting 4), the master clock controller 708 for master clock channel 1, MCLK 1, is set to receive clocking information from network interface module 1 (setting 1), and the backplane clock switch 720 for backplane clock channel 1 is active. The combination of settings on switch module 1 causes the recovered clock from port 3 to be distributed to backplane clock channel 1, 750. Referring to the slot 14 switch module 704 of FIG. 7B, the master clock controller 752 for master clock channel 1 is set to receive clocking information from backplane clock channel 1 (setting 5). The master clock controller distributes the channel 1 backplane clock, BPCLK 1, onto master clock channel 1, MCLK 1, of the slot 14 switch module 704. The master clock selector 760 for network interface module 2 on the slot 14 switch module is set to receive clocking information from master clock channel 1 2(setting 1) and the transmission clock multiplexers 762 for ports 1 and 2 of network interface module 2 are set to utilize MCLK 1 as their transmission clock (setting 2). Because port 3 of network interface module 1 on the slot 1 switch module and ports 2 and 3 of network interface module 2 on the slot 14 switch module are utilizing the same clock, a synchronous connection exists between the ports.

Although specific examples of clock distribution configurations are shown and described with reference to FIGS. 2–7B, it should be appreciated that a large number of other clock distribution configurations are possible.

Failure Protection

As described above, clocking information recovered from one port in a chassis may be utilized by other ports in the chassis to transmit data in a synchronized manner. In the event that a recovered clock fails, the ports that are utilizing the recovered clock are left without a transmission clock. In order to minimize packet loss caused from the failure of a distributed clock, the clock distribution system described above includes hardware and firmware based failure protection mechanisms that provide a secondary clock to effected ports shortly after a failure occurs.

The type of hardware based failure protection mechanism provided to a port depends on the type of clock distribution failure that occurs. The first hardware based failure protection mechanism reacts to the loss of a source clock at the network interface module level and is referred to as lost source clock switching. The second hardware based failure protection mechanism reacts to the loss of an entire switch module and is referred to as link fault interrupt switching.

Lost Source Clock Switching

Referring back to FIGS. 4 and 5, lost source clock switching is a hardware based mechanism that provides failure protection for a switch module when clocking information can no longer be recovered from the receiving port due to, for example, a transmission delay, a transmission error, or a link failure. For example, in FIGS. 4 and 5, the recovered clock from port 3 of network interface module 1 on the slot 1 switch module is being distributed to ports 1–4 of network interface module 4 over master clock channel 1. If the clocking information from port 3 can no longer be recovered, then all of the ports that are relying on the distributed clock are idled until a new transmission clock is provided. In a high speed packet switched network this may lead to a large volume of lost packets.

In an embodiment, the receive clock multiplexers 526 shown in FIG. 5 include a fault monitoring system that monitors the link status of each port and that knows which port is supplying clocking information to the master clock controllers. Clock failures occur when the clock supplying link is lost (i.e. no light is being received at the port) or when the clock signal is lost (i.e. light is being received but the clock signal cannot be recovered). In an embodiment, the fault monitoring system includes a field programmable gate array (FPGA). In an embodiment, the fault monitoring system declares a link loss when clocking information is lost for more than four microseconds. Once a link loss is declared, a hardware based signal causes the active receive clock multiplexer 526 to switch to the local clock 524 (setting 1) and as a result, the effected master clock channel is supplied with secondary, or backup, clocking information from the local clock of the respective network interface module.

Figure 8:
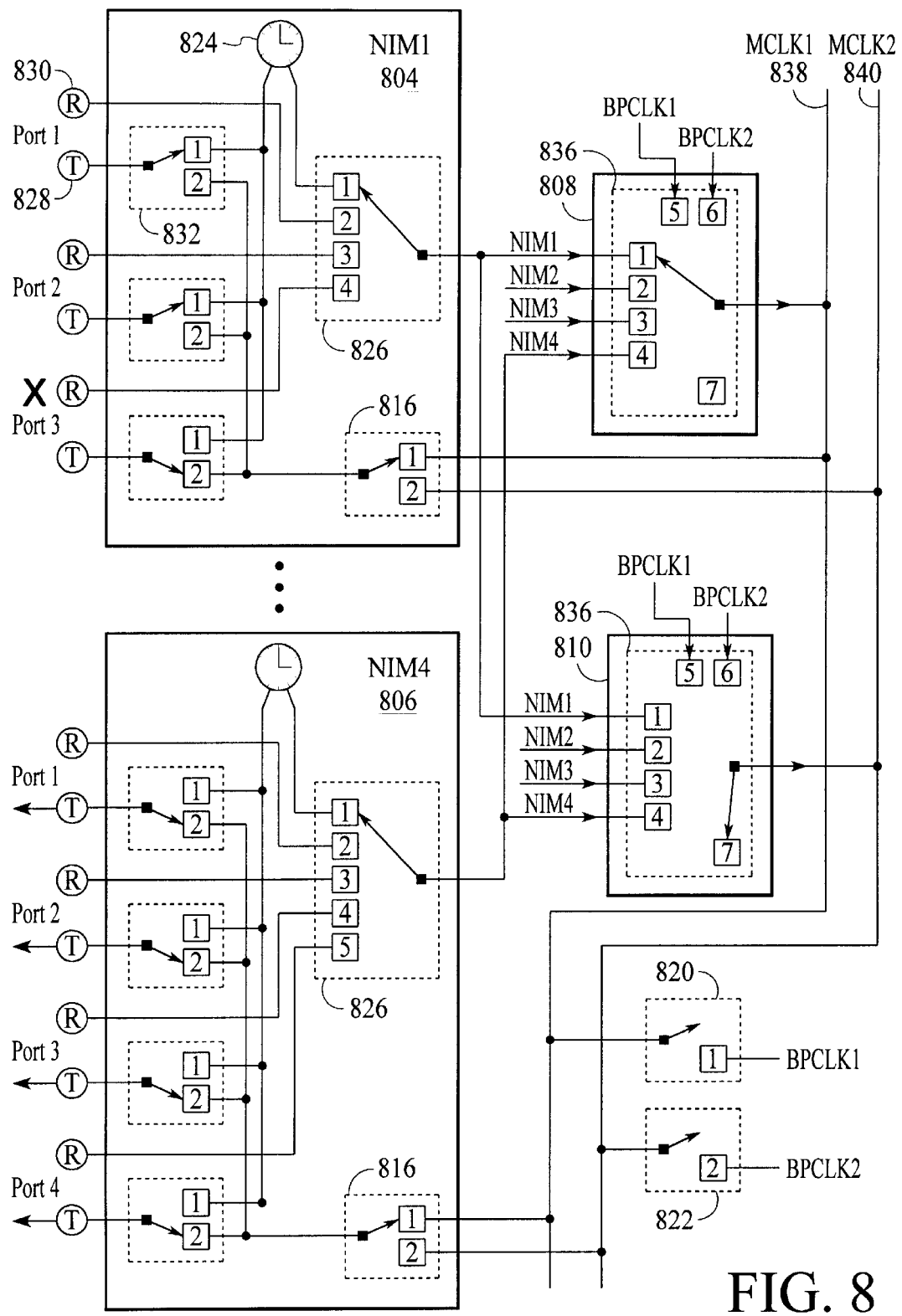
FIG. 8 is a depiction of a configuration of the switch module shown in FIG. 5 after the original source clock has failed and source clock switching has occurred, in accordance with an embodiment of the invention.

FIG. 8 is a depiction of a configuration of the switch module shown in FIG. 5 after the original source clock has failed and the hardware based source clock switch has occurred. As shown in FIG. 8, the receive clock multiplexer 826 for network interface module 1 has been switched from port 3 (setting 4) to the local clock 824 (setting 1). Because the status of the source clock is monitored in hardware near the point where the clock information is received and distributed, and because the receive clock multiplexers are switched in response to hardware based signals, a clock failure can be quickly identified and corrected. In an embodiment, the elapsed time from the loss of the clock signal to the switching of the receive clock multiplexer is thirty microseconds or less. In an embodiment, the receive clock multiplexer can be returned to the original setting after the clocking information from the original source port (i.e., port 3 of network interface module 1) is re-established unless, as is described below, the firmware based failure protection mechanism has established a new secondary clock. In an embodiment, if the firmware has not specified a secondary clock, the receive clock multiplexer is switched back to the original setting only after the clocking information has been maintained for at least thirty-three microseconds.

Link Fault Interrupt Switching

Referring back to FIGS. 6, 7A and 7B, link fault interrupt switching is a hardware based mechanism that provides failure protection when a switch module that is driving a backplane clock channel is removed from the chassis or powered down causing all of the ports that are relying on the backplane channel clock to loose their transmission clock. For example, in FIGS. 7A and 7B, the slot 1 switch module 702 is supplying clocking information to backplane clock channel 1, 750 and backplane clock channel 1 is supplying clocking information to ports 2 and 3 of network interface module 2, 756 on the slot 14 switch module 704. That is, the slot 1 switch module drives the backplane clock for backplane clock channel 1. In an embodiment, backplane clock channel 1 is only driven from master clock channel 1 of a switch module and backplane clock channel 2 is only driven from master clock channel 2 of a switch module although this is not critical. In an embodiment, the backplane clock signal is monitored by all switch modules that are receiving clocking information from the backplane clock channel. In the configuration of FIGS. 7A and 7B, a hardware based link fault monitor 770 within the switch module is utilized to detect a link fault. In an embodiment, a link fault is detected when an active backplane clock signal is lost.

In the event that the switch module (slot 1 switch module) driving the backplane clock channel fails (i.e. is removed from the chassis or powered down), the failure is detected by the link fault monitor 770 of each respective switch module and a link fault interrupt signal is generated. In an embodiment, the link fault interrupt signal is a hardware based signal that is distributed to all of the network interface modules on the switch module that are utilizing the failed backplane clock. Referring to FIG. 7B, the link fault interrupt signal causes all of the transmission clock multiplexers 762 that are set to the master clock channel (setting 2 of the transmission clock multiplexers) and taking from the backplane clock to be switched to their respective local clock 764 (setting 1 of the transmission clock multiplexers). Because the link fault detection occurs in hardware near the point of the link fault and because the transmission clock multiplexers 762 are switched in response to hardware based signals, a clock failure can be quickly identified and corrected. In an embodiment, the transmission clock multiplexers are switched in thirty microseconds or less after link fault interrupt occurs. In an embodiment, the link fault interrupt signal indicates a switch module failure by changing a link fault interrupt indicator bit from high to low.

Figure 9A:
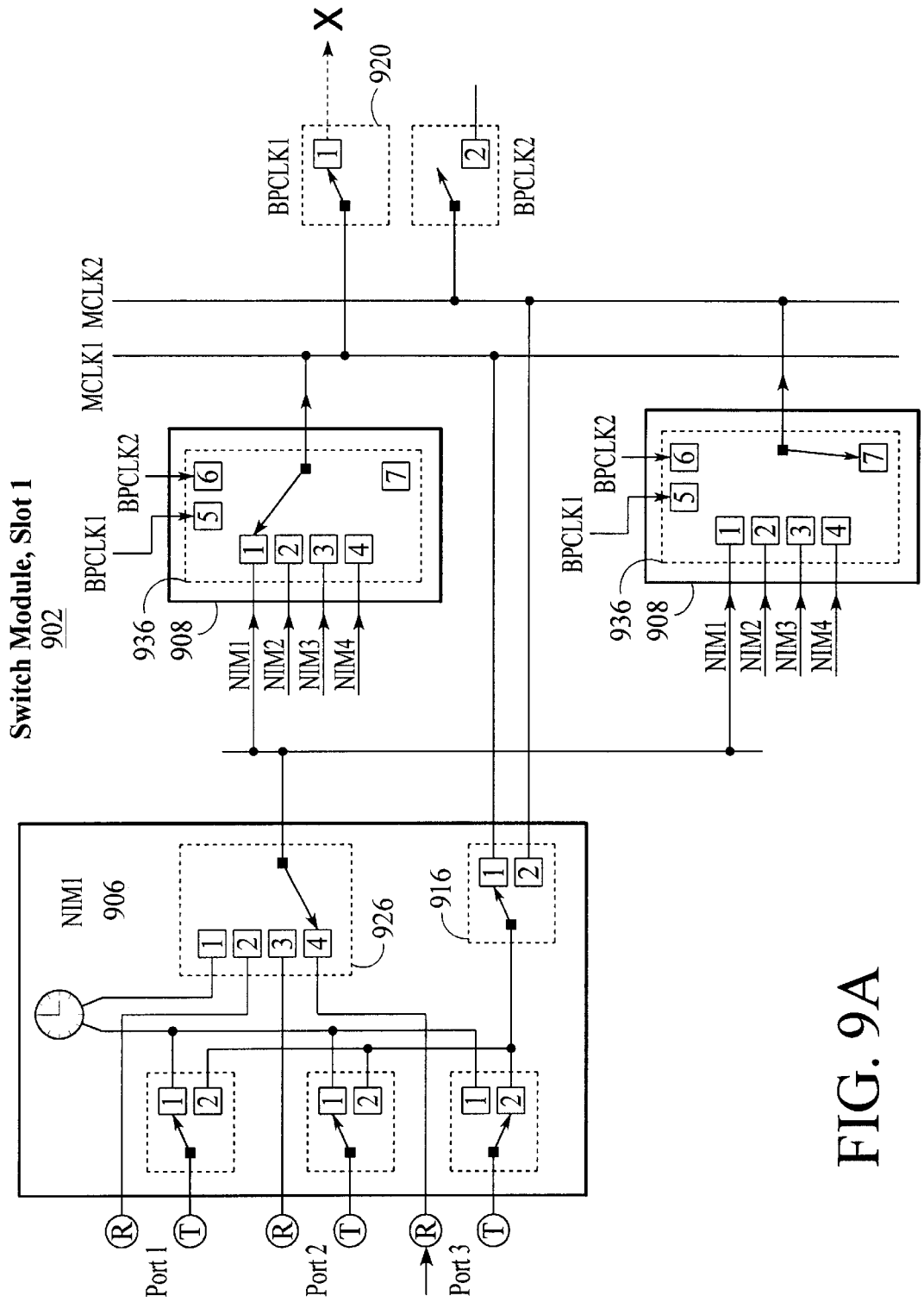
FIGS. 9A and 9B are a depiction of a configuration of the switch modules shown in FIGS. 7A and 7B after link fault interrupt switching has occurred, in accordance with an embodiment of the invention.
Figure 9B:
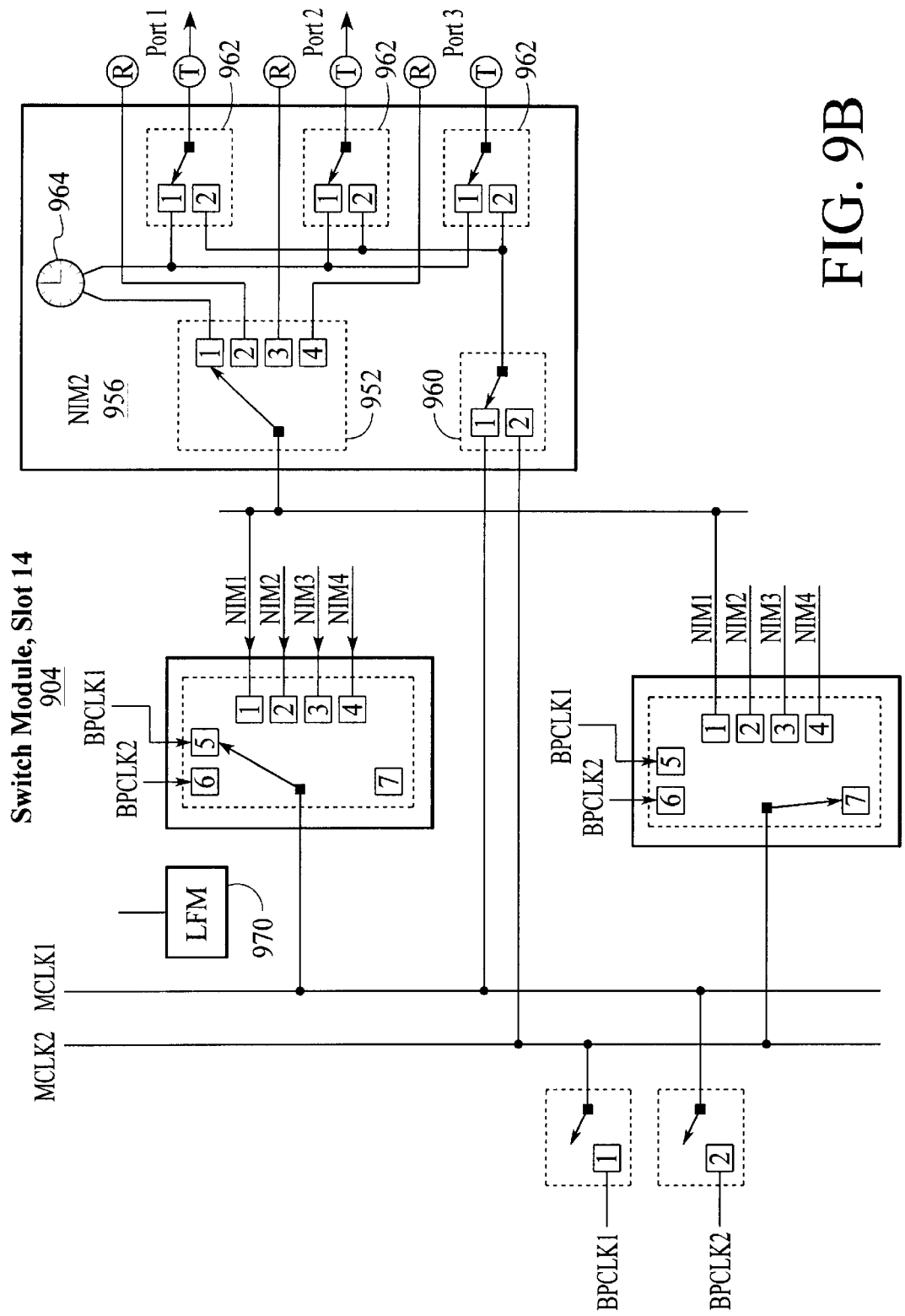

FIGS. 9A and 9B depict the configuration of the switch modules shown in FIGS. 7A and 7B after link fault interrupt switching has occurred as a result of a loss of the backplane clock. As shown in FIG. 9B, the transmission clock multiplexers 962 for ports 1 and 2 of the slot 14 switch module 904 have changed from receiving clocking information from the master clock channel (setting 2) to receiving clocking information from the local clock 964 (setting 1).

Firmware Based Failure Protection

Figure 10:
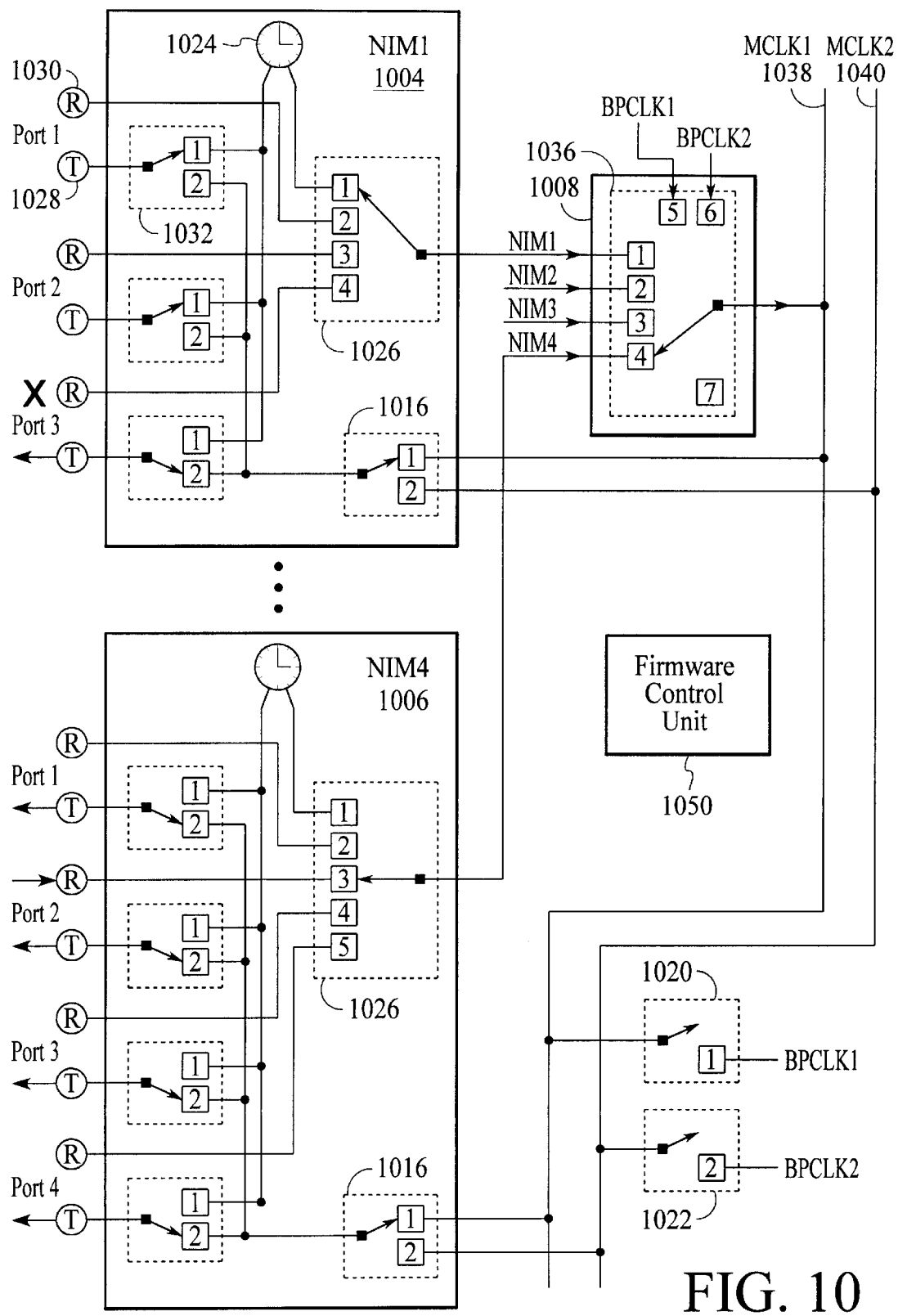
FIG. 10 is a depiction of a switch module that includes a firmware control unit for providing firmware based clock failure protection, in accordance with an embodiment of the invention.

In addition to the hardware based failure protection that is provided through source clock switching and link fault interrupt switching, an embodiment of the clock distribution system includes a firmware based failure protection mechanism. The firmware based failure protection mechanism involves utilizing a secondary setting of the master clock controllers and receive clock multiplexers to establish backup master clocks in the event that the primary master clock is lost. It should be noted that the firmware based failure protection mechanism is typically slower than the hardware based failure protection mechanism and therefore the firmware based failure protection occurs after the above-described hardware based failure protection mechanisms have been activated. Referring to FIG. 10, a firmware control unit 1050 is programmed to provide a specified clock as a secondary clock in case of a failure of a primary clock. In the example configuration of FIG. 10, port 2 of network interface module 4, 1006 has been established through firmware as the secondary master clock.

Referring back to FIG. 5, the master clock controller 508 for master clock channel 1, 538 is set to receive clocking information from network interface module 1, 504 (setting 1) and the receive clock multiplexer 526 for network interface module 1 is set to receive a recovered clock from port 3 (setting 4). In the event that the clocking information from port 3 of network interface module 1 is lost and master clock channel 1 is left without a source clock, the firmware control unit 1050 shown in FIG. 10 causes the master clock controller 508 and a receive clock multiplexer 526 to switch to the programmed secondary settings. FIG. 10 shows the configuration of the switch module after the firmware control unit has caused the switch to the secondary clock. As shown in FIG. 10, the master clock controller 1008 for master clock channel 1, 1038 is now set to receive clocking information from network interface module 4, 1006 (setting 4) and the receive clock multiplexer 1026 for network interface module 4 is set to receive a recovered clock from port 2 (setting 3).

The switch from the primary master clock settings to the secondary master clock settings is triggered by the failure detection circuitry in the lost source clock switching mechanism and the link fault interrupt switching mechanism. The source of the clocking information that is supplied through firmware based failure protection is fully programmable through a user interface. Because the source of the backup clock is fully programmable, the switch to the secondary master clock settings provides a more permanent and customized solution to clock failure protection than the hardware based mechanism.

In an embodiment, the firmware control unit is not programmed to provide a secondary source clock from the same network interface module as the primary source clock. For example, the secondary source clock in the configuration of FIG. 5 is not provided from network interface module 1, 504 because the primary source clock is provided from network interface module 1 and the master clock controller 508 must be switched to a different network interface module to obtain a different clock.

Another embodiment of the firmware based failure protection involves providing a secondary source clock from a different switch module than the switch module that is driving the backplane clock. For example, referring back to FIGS. 7A and 7B, a backup clock can be established on a switch module other than the slot 1 switch module to backup the clock that is being provided to the backplane clock channel 750 by the slot 1 switch module. For example, a firmware control unit (not shown) for the slot 14 switch module can be set to obtain a secondary source clock from one of the ports on the slot 14 switch module utilizing the firmware based failure protection mechanism described above. When the primary and secondary backplane clocks are assigned on different switch modules, the secondary backplane clock is still available to drive the backplane when the switch module supplying the primary backplane clock is removed or fails. That is, the chassis is not dependent on any one switch module for all distributed clocking information.

Figure 11:
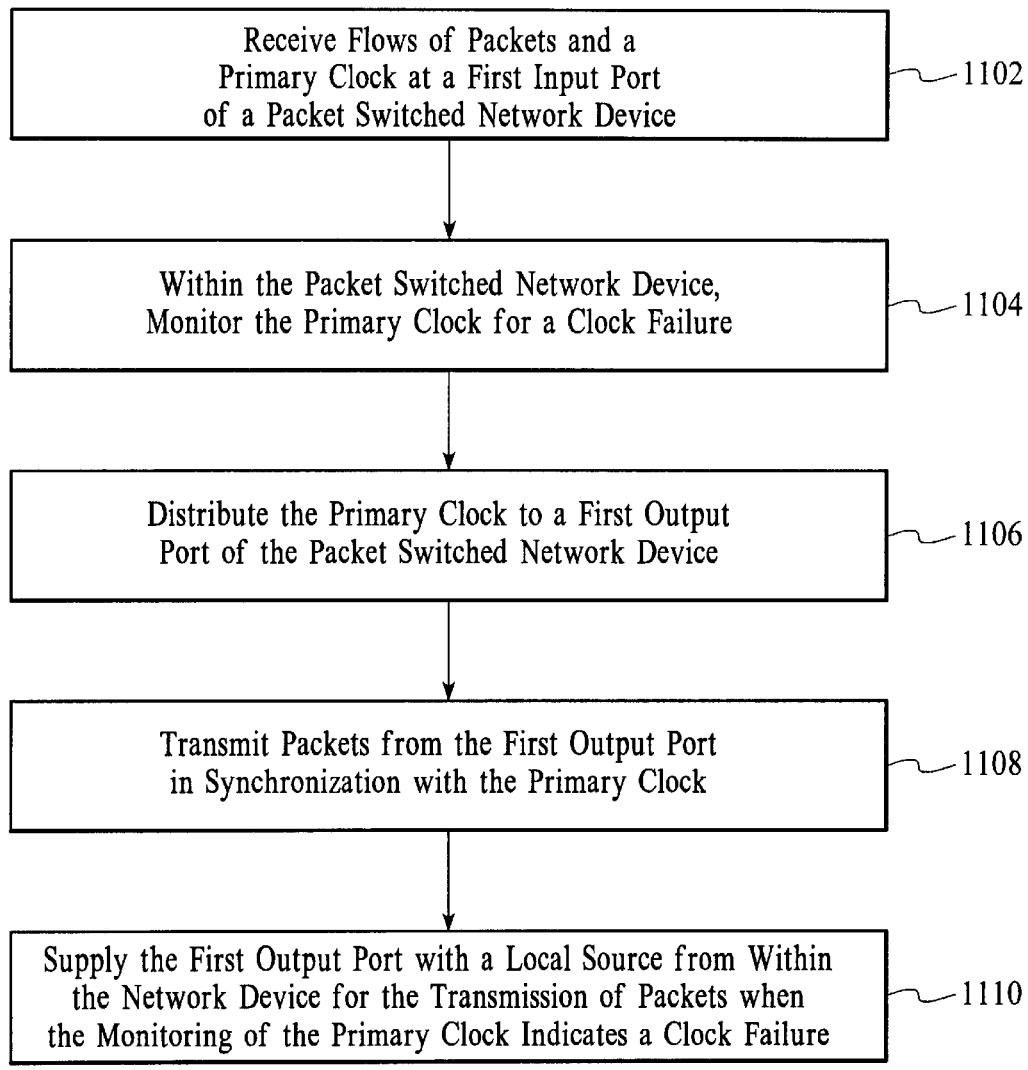
FIG. 11 is a process flow diagram of a method for providing clock failure protection in accordance with an embodiment of the invention.

A method for providing clock failure protection in a packet switched network device is depicted in the process flow diagram of FIG. 11. In a step 1102, flows of packets and a primary clock are received at a first input port of a packet switched network device. In a step 1104, the primary clock is monitored for a clock failure within the packet switched network device. In a step 1106, the primary clock is distributed to a first output port of the packet switched network device. In a step 1108, packets are transmitted from the first output port in synchronization with the primary clock. In a step 1110, the first output port is supplied with a local clock source from within the network device for the transmission of packets when the monitoring of the primary clock indicates a clock failure.

What is claimed is:

1. A switch module having input ports and output ports, that switches packets from an input port to an output port comprising:
    a first input port for receiving flows of packets and a primary clock;
    means within said switch module for detecting a failure of said primary clock;
    a first output port for transmitting flows of packets;
    means for distributing said primary clock from said first input port to said first output port;
    means for transmitting packets from said first output port in synchronization with said primary clock;
    means for providing a secondary clock within said switch module; and
    means for supplying said secondary clock to said first output port upon detection of a failure of said primary clock by said means for detecting a failure;
    wherein said means for distributing said primary clock from said first input port to said first output port includes:
        at least one receive clock multiplexer configured to forward clock information from an input port or a local clock source;
        at least one master clock controller that includes a master clock multiplexer, said master clock multiplexer configured to forward clock information received from said at least one receive clock multiplexer; and
        a transmission clock multiplexer associated with each output port configured to select clock information from a local clock or from said at least one master clock controller.

2. The switch module of claim 1 wherein said means for detecting a failure of said primary clock includes a field programmable gate array located within said switch module.

3. The switch module of claim 2 wherein said field programmable gate array is configured to identify said first input port, from a plurality of input ports, as the port that is receiving said primary clock.

4. The switch module of claim 1 wherein said secondary clock is supplied to said first output port by said supplying means within 30 microseconds after a failure of said primary clock.

5. The switch module of claim 1 wherein said means for distributing said primary clock to said first output port includes means for distributing said primary clock to a plurality of output ports within said switch module.

6. The switch module of claim 1 wherein said means for providing a secondary clock includes a local clock source that is located within said switch module.

7. The switch module of claim 6 wherein said means for supplying said secondary clock includes a receive clock multiplexer associated with said first input port that switches from receiving said primary clock from said first input port to receiving said secondary clock from said local clock source.

8. The switch module of claim 1 wherein said means for providing a secondary clock includes a second input port for receiving said secondary clock.

9. The switch module of claim 8 wherein said means for supplying said secondary clock includes a firmware control unit that causes said secondary clock to be distributed from said second input port to said first output port.

10. The switch module of claim 1 wherein said means for detecting a failure of said primary clock includes a link fault monitor that monitors a backplane clock signal from a second switch module.

11. The switch module of claim 1 wherein said first input port and said first output port transmit packets utilizing an asynchronous transfer mode protocol.

12. A network device for switching packets comprising:
    a first switch module located within said network device, said first switch module including a first input port for receiving flows of packets and a primary clock;
    means for distributing said primary clock from said first input port to output ports on other switch modules within said network device;
    a second switch module located within said network device, said second switch module including;
        a first output port for transmitting packets in synchronization with said primary clock;
        means for providing a secondary clock;
        means for detecting a failure of said primary clock; and
        means for supplying said secondary clock to said first output port upon detection of a failure of said primary clock;
    wherein said means for detecting a failure includes a link fault monitor located within said second switch module that monitors the distribution of said primary clock, wherein said link fault monitor includes circuits configured to generate a link fault interrupt signal in response to a failure of said primary clock; and wherein said means for providing a secondary clock further includes:
a local clock source that is located within said second switch module; and
a transmission clock multiplexer associated with said first output port that switches from receiving said primary clock from said first switch module to receiving said secondary clock from said local clock source in response to said link fault interrupt signal.

13. The network device of claim 12 wherein said means for providing said secondary clock includes a local clock source that is located within said second switch module.

14. The network device of claim 13 wherein said means for supplying said secondary clock includes a transmission clock multiplexer associated with said first output port that switches from receiving said primary clock from said first switch module to receiving said secondary clock from said local clock source in response to detection of a failure of said primary clock.

15. The network device of claim 14 wherein said transmission clock multiplexer switches from receiving said primary clock from said first switch module to receiving said secondary clock from said local clock source within 30microseconds of a failure of said primary clock.

16. The network device of claim 12 wherein said means for distributing said primary clock includes a backplane and a backplane clock channel that distributes clock signals between said first and second switch modules and wherein said means for providing said secondary clock includes a backplane clock channel input that is connected to said backplane clock channel.

17. The network device of claim 16 wherein said backplane clock channel input is connected to receive said secondary clock from an input port of a third switch module.

18. A switch module comprising:
a plurality of network interface modules, each of said network interface modules including:
at least one input port for receiving packets;
at least one output port for transmitting packets;
a local clock source;
a receive clock multiplexer configured to detect a failure of a primary clock and to switch from selecting said primary clock to selecting a secondary clock in response to detecting a failure of said primary clock; and
a transmission clock multiplexer associated with each output port; and at least one master clock controller in signal communication with said receive clock multiplexers, said master clock controller including a master clock multiplexer configured to forward clock information received from said at least one receive clock multiplexer to said transmission clock multiplexers;

said transmission clock multiplexers being configured to select clock information from said local clock source or from said at least one master clock controller.

19. A network device for switching packets comprising:
a backplane;
a plurality of switch modules that are in signal communication with each other via said backplane, each of said switch modules including;
a plurality of network interface modules, each of said network interface modules including:
at least one input port for receiving packets;
at least one output port for transmitting packets;
a local clock source;
a receive clock multiplexer configured to detect a failure of a primary clock and to switch from selecting said primary clock to selecting a secondary clock in response to detecting a failure of said primary clock; and
a transmission clock multiplexer associated with each output port;
at least one master clock controller in signal communication with said receive clock multiplexer, said master clock controller including a master clock multiplexer configured to forward clock information received from said at least one receive clock multiplexer; and
a link fault monitor configured to monitor said primary clock when said primary clock is communicated from a first one of said switch modules across said backplane to a second one of said switch modules and to generate a link fault interrupt signal at said second one of said switch modules in response to a failure of said primary clock;
said transmission clock multiplexers being configured to switch from selecting clock information from said master clock controller to selecting clock information from said local clock source in response to said link fault interrupt signal.

* * * * *